Figure 1:
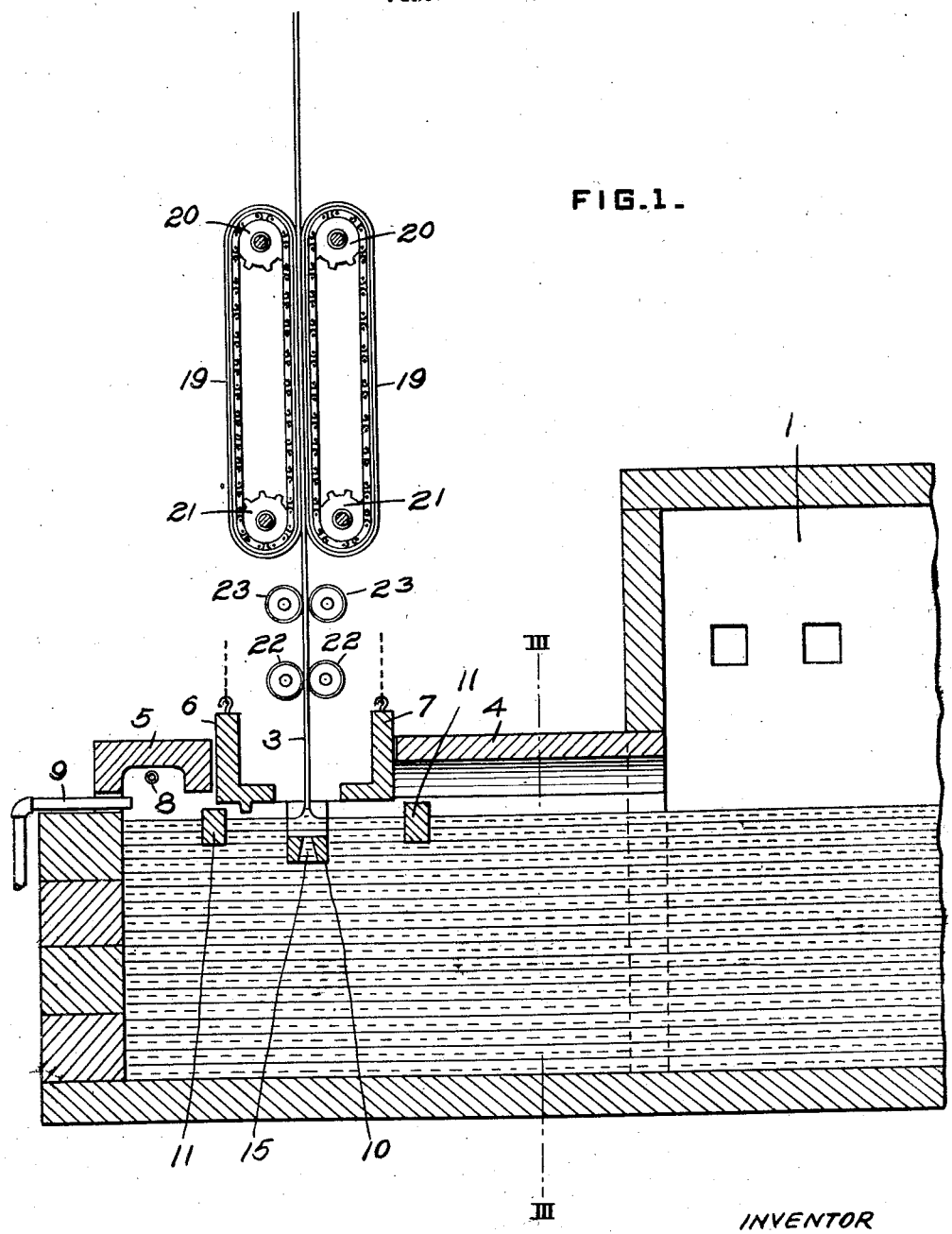

July 7, 1925. 1,544,948

H. G. SLINGLUFF

APPARATUS FOR DRAWING SHEET GLASS

Filed Nov. 8, 1921   3 Sheets-Sheet 2

INVENTOR
H. G. Slingluff
by
James L. Bradley
atty

July 7, 1925.  1,544,948

H. G. SLINGLUFF

APPARATUS FOR DRAWING SHEET GLASS

Filed Nov. 8, 1921     3 Sheets-Sheet 3

INVENTOR
H. G. Slingluff
James C. Bradley
atty.

Patented July 7, 1925.

1,544,948

UNITED STATES PATENT OFFICE.

HARRY G. SLINGLUFF, OF MOUNT VERNON, OHIO, ASSIGNOR TO PITTSBURGH PLATE GLASS COMPANY, A CORPORATION OF PENNSYLVANIA.

APPARATUS FOR DRAWING SHEET GLASS.

Application filed November 8, 1921. Serial No. 513,678.

*To all whom it may concern:*

Be it known that I, HARRY G. SLINGLUFF, a citizen of the United States, and a resident of Mount Vernon, in the county of Knox and State of Ohio, have made a new and useful invention in Improvements in Apparatus for Drawing Sheet Glass, of which the following is a specification.

Figure 2:
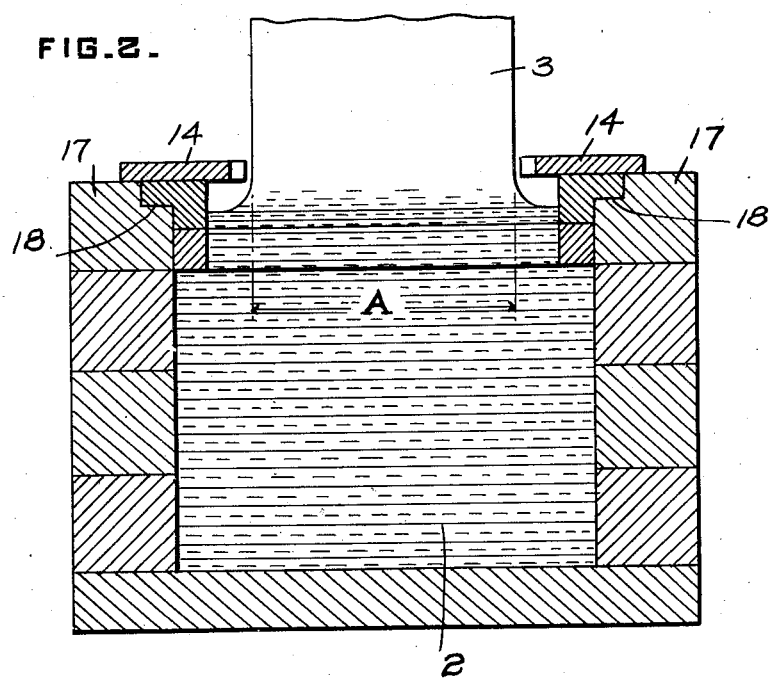
Figure 3:
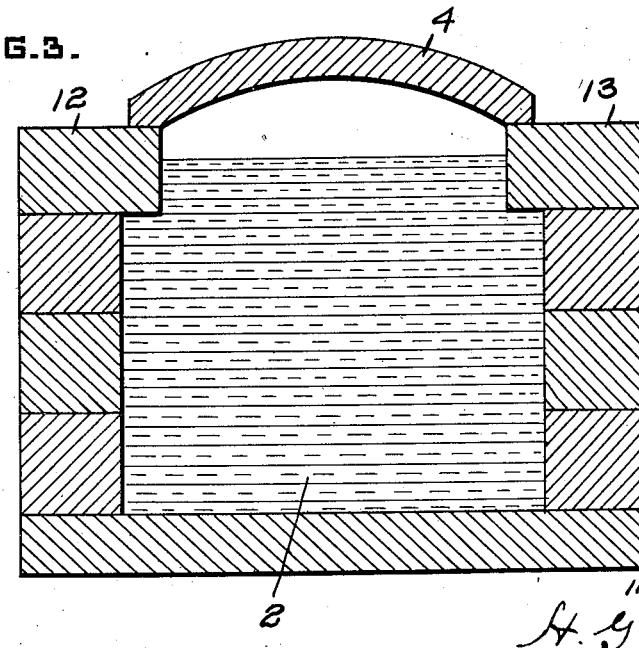
Figure 4:
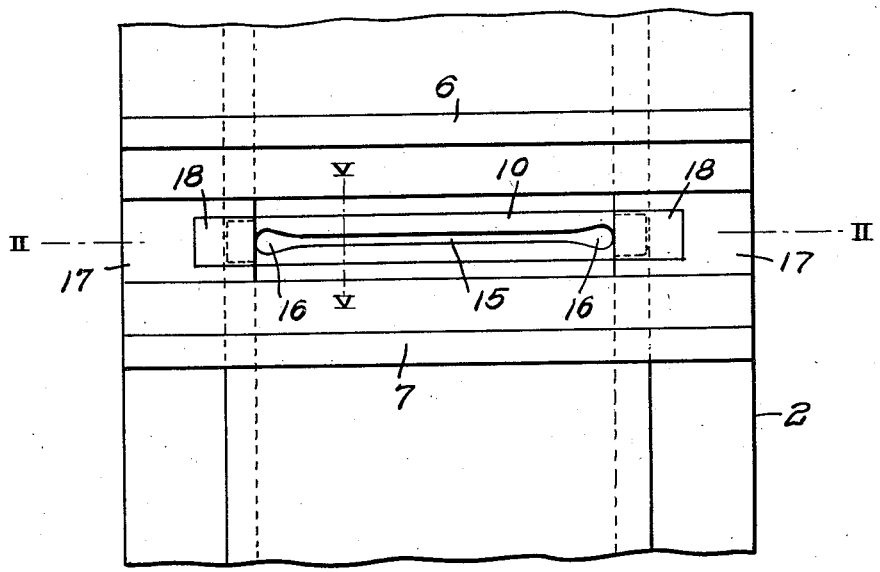
Figure 5:
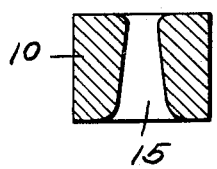
Figure 6:
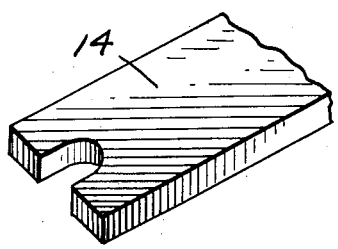

The invention relates to an apparatus for drawing sheet glass upwardly from a tank. It has for its main objects an improved apparatus designed to prevent the line of generation of the glass from moving or shifting its position longitudinally of the drawing tank, and for preventing the sheet from warping during the drawing operation, while at the same time avoiding the objections as to lining or marring incident to drawing from a clay slot. One embodiment of the invention is illustrated in the accompanying drawings, wherein:

Figure 1 is a vertical section taken through the drawing tank. Fig. 2 is a section on the line II—II of Fig. 4. Fig. 3 is a section on the line III—III of Fig. 1. Fig. 4 is a partial plan view of the central portion of the drawing tank. Fig. 5 is a section through the chilling bar on the line V—V of Fig. 4. And Fig. 6 is a perspective view of one of the shielding blocks employed adjacent the edges of the sheet being drawn.

Referring to the drawings, 1 is the melting tank, which may be of any approved form and which is provided with the usual regenerative heating means, and 2 is the drawing tank. As indicted in Fig. 1, the drawing tank 2 is of considerable depth, so as to give a depth of glass preferably ranging from two to four feet. This considerable body of glass tends to give a constant temperature, but if desired this heat may be supplemented by the application of heating means beneath or at the sides of the tank, as is well known in the art. The width of the tank depends upon the width of the sheet which it is desired to draw, such width being, for instance, about four feet where the width of the sheet to be drawn is three feet. As indicated in Fig. 3, the tank is of full width at the inlet end, where it communicates with the tank 1, so that there is no throttling of the flow of glass from the melting tank, which arrangement tends to give a body of glass beneath the line of generation of the sheet 3 of substantially uniform temperature throughout the area corresponding to the width of the sheet.

The drawing tank is capped with the arch 4 at the end adjacent the melting tank and with the block 5 adjacent the rear end of the drawing tank. A pair of shielding members 6 and 7, L-shaped in cross section, are provided on opposite sides of the sheet, which shielding members may be supported for vertical adjustment if desired, by means not shown, but illustrated in my copending application, Serial No. 265,443. The outer or rear end of the drawing tank is heated by a plurality of burners 8 and 9, in order to prevent the body of glass in this end of the tank from becoming chilled to a temperature below that of the body of glass in the forward portion of the drawing tank. The guide bar 10 is used beneath the line of generation of the sheet 3, and skimming bars 11 (Fig. 1) employed to the sides thereof to prevent impurities at the surface of the glass from working their way along from the melting tank to the sheet being drawn.

The upper tier of blocks 12 and 13 constituting the side walls of the drawing tank are preferably extended inward so as to form an overhang, as indicated in Figs. 2 and 3. This expedient tends to give a body of glass in the tank of relatively large volume as compared with the width of the sheet 3 which is to be drawn, so that the heat storage capacity of the tank is increased and the tendency to maintain the temperature of the body of glass across the area marked A in Fig. 2 and corresponding to the width of the sheet is increased, the purpose accomplished being the securing above and below the bar 10 of a body of glass which is uniform in temperature so that the sheet 3 is drawn or generated from glass of uniform temperature and the tendency to produce strain and warpage in such sheet reduced to a minimum.

In order to still further offset the tendency of the side portions of the bath from which the drawing of the side portions of the sheet occurs to cool more rapidly than the central portion of the body of glass, due to the proximity of the side walls of the tank, the reflecting blocks 14 are employed, as indicated in Figs. 2 and 6, such blocks resting upon the side walls of the tank in line with the sheet being drawn and overhanging the surface of the bath. These blocks which are shown and claimed in my copending application Serial No. 265,443 reflect a portion of the heat radiated from the surface of the glass, thus tending to maintain the temperature of those portions of the layer of glass from which the drawing occurs, which would otherwise cool more rapidly than the inner portions of such layer. These blocks lie in position freely movable upon the side walls of the tank so that they may be adjusted to meet requirements.

The construction of the bar 10 constitutes one of the features of my invention. This bar is provided with a slot 15 tapering preferably in width from two inches at the top to four inches at the bottom (Fig. 5) and extending from one edge of the tank to the other, as indicated in Fig. 4. This slot is enlarged at each end 16, which permits a freer flow of glass up through the bar at the ends than at the central portion and still further tends to offset any greater cooling of the glass adjacent the edges of the sheet than at the central portion.

The overhanging blocks 17 opposite the edges of the sheet 3 (Fig. 2) are vertically slotted so as to receive the ends of the bar 10 and such bar is held down in position by the blocks 18, which blocks fit down into the cutaway portions of the blocks 17. In this way the bar 10 is securely held in the position of submergence illustrated in Figs. 1 and 2, its upper surface at such time lying preferably from two to four inches below the surface of the glass, although this distance may be varied to suit conditions.

The use of the slotted bar 10 tends to maintain the line of generation of the sheet perfectly straight and in position directly above the slot. The glass which enters into the skin of the sheet is drawn from the surface of the bath lying above the bar 10 on each side thereof, and this glass, which forms the surface of the sheet, is remote laterally from any anchoring or chilling body of glass, so that there is nothing to mar the surface, thus distinguishing from those operations in which the glass is drawn from a slot either corresponding to the thickness of the sheet or much wider, and in which the proximity to the clay produces vertical lines in the surface of the sheet.

The sheet may be drawn by any desired type of drawing mechanism, although the type illustrated in my Patent No. 1,364,895 is preferred, such type of apparatus being illustrated diagrammatically in Fig. 1 of the present application. This apparatus, in its simplest form, comprises a pair of endless belts 19 of asbestos, carried by the pulleys 20 and 21, driven by suitable mechanism not shown. This belt apparatus prevents the glass from cooling too rapidly and after passing the upper pulleys 20 it is cut off by any suitable means. Asbestos rolls 22 and 23 may also be used intermediate the bath and the asbestos curtains in order to assist in holding the sheet straight, and such rolls may also be driven by means not shown, in order to assist in drawing the sheet.

During the drawing operation there is a tendency of the sheet to draw in at its edges and thus narrow, which tendency is preferably counteracted by the use of the tool and process shown and described in my Patent No. 1,376,975, such process involving the step of pressing elongated recesses or pockets at intervals in the body of molten glass with a cooling tool applied on each side of the edge in close proximity thereto. If desired the speed of cooling of the sheet and the consequent speed of draw permissible may be increased by the use of water cooled pipes or other cooling members arranged above the surface of the bath in proximity to the line of generation of the sheet as illustrated in the patent to Lubbers, No. 766,275.

What I claim is:

1. In combination in apparatus for drawing sheet glass, a glass drawing tank adapted to carry a bath of molten glass from which a sheet is to be drawn, a clay bar extending transversely from one side of the tank to the other and entirely submerged beneath the glass of the tank with the glass of the bath lying over and contacting with the upper surface of the bar and provided with a vertical slot lying longitudinally thereof and extending therethrough, and means for drawing a sheet upward from the glass above the bar and in alignment with said slot.

2. In combination in apparatus for drawing sheet glass, a glass drawing tank adapted to carry a bath of molten glass from which a sheet is to be drawn, a clay bar extending transversely from one side of the tank to the other and entirely submerged beneath the glass of the tank with the glass of the bath lying over and contacting with the upper surface of the bar and provided with a vertical slot lying longitudinally thereof and extending therethrough, and means for drawing a sheet upward from the glass above the bar and in alignment with said slot, the said slot increasing in width from the upper to the lower side of the bar.

3. In combination in apparatus for drawing sheet glass, a glass drawing tank adapted to carry a bath of molten glass from which a sheet is to be drawn, a clay bar extending transversely from one side of the tank to the other and entirely submerged beneath the glass of the tank and provided with a vertical slot lying longitudinally thereof and extending therethrough, and means for drawing a sheet upward from the glass above the bar and in alignment with said slot, the said slot having enlargements at its ends beneath the edges of the sheet being drawn.

In testimony whereof, I have hereunto subscribed my name this 26th day of October, 1921.

HARRY G. SLINGLUFF.